(12) United States Patent
Geibel et al.

(10) Patent No.: US 6,436,163 B1
(45) Date of Patent: Aug. 20, 2002

(54) METAL FILTER FOR HIGH TEMPERATURE APPLICATIONS

(75) Inventors: Stephen A. Geibel, Cortland, NY (US); Paul C. Koehler, deceased, late of Cortland, NY (US), by Christine Koehler, legal representative; John L. Hurley, deceased, late of Waldwick, NJ (US), by Joan M. Hurley, legal representative (73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/220,453

(22) Filed: Dec. 24, 1998

Related U.S. Application Data (63) Continuation of application No. 09/093,732, filed on Jun. 9, 1998, now abandoned, which is a continuation of application No. 08/754,480, filed on Nov. 22, 1996, now abandoned, which is a continuation of application No. PCT/US95/06201, filed on May 22, 1995, which is a continuation-in-part of application No. 08/247,354, filed on May 23, 1994, now abandoned, which is a continuation of application No. 08/903,062, filed on Jul. 30, 1997, now abandoned.

(51) Int. Cl.$^7$ .......................... B01D 39/20; C22C 33/02; C22C 33/06

(52) U.S. Cl. ................. 55/523; 55/DIG. 5; 210/510.1; 419/2; 419/31; 419/42; 419/54; 420/79; 420/106; 420/110

(58) Field of Search ...................... 55/302, 523, DIG. 5; 210/510.1; 419/2, 5, 31, 38, 39, 42, 54; 420/77, 79, 81, 106, 110, 121, 123, 125, 127, 551

(56) References Cited

U.S. PATENT DOCUMENTS

| | | | |
|---|---|---|---|
| 1,550,507 A | * | 8/1925 | Coolidge |
| 1,550,508 A | * | 8/1925 | Cooper |
| 1,990,650 A | * | 2/1935 | Jaeger ............................ 71/1 |
| 2,239,800 A | * | 4/1941 | Vogt et al. ................ 55/523 X |
| 2,554,343 A | * | 5/1951 | Pall .......................... 55/523 X |
| 2,597,217 A | * | 5/1952 | Zenick ................ 210/510.1 X |
| 2,826,805 A | * | 3/1958 | Probst et al. ........ 210/510.1 X |
| 3,026,197 A | * | 3/1962 | Schramm ..................... 75/124 |
| 3,248,183 A | * | 4/1966 | Powell et al. .............. 55/523 X |
| 3,298,826 A | * | 1/1967 | Wukusick .................. 420/77 X |
| 3,342,563 A | * | 9/1967 | Butts .......................... 419/2 X |
| 3,395,986 A | * | 8/1968 | Gruber ................ 210/510.1 X |
| 3,933,652 A | * | 1/1976 | Weichselbaum et al. .................... 210/510.1 X |
| 4,270,936 A | * | 6/1981 | Mann ........................ 55/523 X |
| 4,405,368 A | * | 9/1983 | Ray et al. ...................... 420/77 |
| 4,435,483 A | * | 3/1984 | Åhslund et al. ............. 419/2 X |
| 4,562,039 A | * | 12/1985 | Koehler .......................... 419/2 |
| 4,612,165 A | * | 9/1986 | Liu et al. ...................... 420/459 |
| 4,711,761 A | * | 12/1987 | Liu et al. ..................... 420/459 |
| 4,722,828 A | * | 2/1988 | Liu .............................. 420/455 |
| 4,731,221 A | * | 3/1988 | Liu .............................. 420/445 |
| 4,732,594 A | * | 3/1988 | Mizrah et al. ................. 55/523 |
| 4,758,272 A | * | 7/1988 | Pierotti et al. ............ 55/523 X |
| 4,822,692 A | * | 4/1989 | Koehler ....................... 428/547 |
| 4,828,930 A | * | 5/1989 | Koehler ...................... 419/2 X |
| 4,844,865 A | * | 7/1989 | Shimada et al. ............... 420/79 |
| 4,894,158 A | * | 1/1990 | Morita et al. .............. 55/523 X |
| 4,961,903 A | * | 10/1990 | McKamey et al. ........... 420/79 |
| 5,149,360 A | * | 9/1992 | Koehler et al. ................ 75/228 |
| 5,158,744 A | * | 10/1992 | Nazmy ..................... 420/79 X |
| 5,269,830 A | | 12/1993 | Rabin et al. |
| 5,378,426 A | * | 1/1995 | Geibel et al. .................... 419/2 |
| 5,411,702 A | * | 5/1995 | Nazmy et al. ................. 420/79 |
| 5,422,070 A | * | 6/1995 | Nazmy et al. ............. 420/79 X |

FOREIGN PATENT DOCUMENTS

| | | | | |
|---|---|---|---|---|
| DE | 3941698 | * | 6/1991 | .................. 55/523 |
| JP | 02-175803 | * | 7/1990 | .................. 55/523 |
| JP | 03-270706 | * | 12/1991 | .................. 55/523 |

OTHER PUBLICATIONS

Pall Corporation; *Pall Porous Metal Filters for Solids Separation in Liquid and Gas Service*; 1983.

Pall Corporation; *The Pall Gas Solid Separation System for the chemical Process, Refining , and Mineral Industries*; 1987.

* cited by examiner

Primary Examiner—Robert H. Spitzer
(74) Attorney, Agent, or Firm—Leydig Voit & Mayer, Ltd.

(57) ABSTRACT

A porous metal filter possessing enhanced anticorrosive properties is provided including sintered metal particles composed of an alloy composition of iron aluminide having a range in concentration corresponding to $Fe_3Al$ to $FeAl$ phases and having a Bubble Point ratio of about 1.6 or less.

20 Claims, 4 Drawing Sheets

METAL FILTER FOR HIGH TEMPERATURE APPLICATIONS

CROSS REFERENCE TO RELATED APPLICATION

This application is a continuation of U.S. application Ser. No. 09/093,732, filed Jun. 9, 1998, and now abandoned, which was a continuation of U.S. application Ser. No. 08/903,062, filed Jul. 30, 1997, and now abandoned, which was a continuation of U.S. application Ser. No. 08/754,480, filed Nov. 22, 1996, and now abandoned, which was a continuation of International Application No. PCT/US95/06201, filed May 22, 1995, which was a continuation-in-part of U.S. application Ser. No. 08/247,354, filed May 23, 1994, and now abandoned.

TECHNICAL FIELD

This invention relates to filters and to a method for making filters which remove one or more substances, such as fine solids, from a fluid, i.e., a liquid or a gas. More particularly, this invention relates to metal filters and a method for making such filters useful under adverse conditions such as corrosive environments at elevated temperatures and pressures.

BACKGROUND ART

Metal filters have long been used for a variety of applications. For example, porous stainless steel filters prepared from sintered metal particulate, e.g., stainless steel powder, have found use in a variety of processes where high pressure drops are acceptable and in applications where relatively fine filtration capability must be combined with mechanical strength, resistance to high temperatures, and/or resistance to chemical attack. While presently available stainless steel filters are acceptable for many such applications, they and other presently available filters suffer from severe shortcomings in certain hostile environments, e.g., high temperature processes for treatment of sulfur-containing fossil fuels such as sour crude and some coals, catalytic cracking, filtration of contaminated hydrocarbons, stack scrubbing systems, etc.. Sulfur containing environments prove to be particularly corrosive and destructive to ordinary stainless steel filter structures.

Conventional metal filters, typically prepared from austenitic stainless steel, e.g. 300 Series, rapidly corrode at elevated temperatures in the presence of sulfur due to the relatively high surface area and permeable nature of a filter structure vis-a-vis a pipe or vessel wall. The skilled artisan familiar with corrosion chemistry is aware that sulfur invasion between the grain structure of the steel leads to reactive formation of iron sulfates, iron sulfites, pyrites, etc., which in turn speed the decomposition of the exposed steel structure. In short, such filters do not have a long on-stream service life in high temperature oxidizing environments, reducing sulfidation environments, and fluid catalyst cracking applications.

Since processes such as the treatment of fossil fuels, are typically carried out at elevated pressures as well as elevated temperatures, the potential for extremely serious damage to equipment or even catastrophic failure is always attendant in such processes. A particular application where a filter structure is subjected to a high level of stress is in processes which utilize a blow back technique for periodic cleaning of the filter surface by reverse flow or jet pulsing. Differential pressures of 0.1 to 20.0 pounds per square inch (psi) (7.0 to 1410 $g/cm^2$), and more typically, 0.1 to 10 psi (7.0 to 705 $g/cm^2$) are used in the forward and reverse directions for carrying out the blow back process to dislodge solids which have formed on the surface of the filter. When such a process is carried out in a system where the filter is continuously exposed to high temperatures with sulfur present, the potential for catastrophic failure is enhanced.

Disclosure of Invention

This invention is directed to a metal filter with excellent resistance to deterioration/corrosion in applications where high temperatures and high pressures are encountered in concert with adverse chemical environments, such as high sulfur levels.

A porous metal filter possessing enhanced anticorrosive properties is provided by the present invention which includes sintered metal particles composed of an alloy composition of iron aluminide having a range in concentration corresponding to $Fe_3Al$ to FeAl phases and having a Bubble Point ratio of about 1.6 or less.

An object of this invention is to provide a filter with the requisite properties for such applications and which is capable of withstanding high differential pressures and particularly the severe conditions encountered in the course of such filter being periodically subjected to repeated reverse flow (blow back) or jet pulsing to clean the filter and purge solids which have formed on the filter from the system.

In accordance with the subject invention, a porous metal filter is provided and particularly a seamless, porous metal filter is provided which substantially overcomes the limitations described above with regard to presently available metal filters. Filters in accordance with the subject invention have substantially uniform pore characteristics with concomitant longer on-stream life and uniform blow back characteristics, making them particularly desirable in gas filtration applications where the hostile environment encountered may result in catastrophic failure of conventional metal filters. The metal filters in accordance with the subject invention may have different forms and configurations, but are preferably seamless, hollow or cylindrical, porous structures, preferably of substantially uniform diameter, thickness, and pore structure, comprising sintered metal particulate of a corrosion resistant, iron aluminide alloy, of the type described below, in which the individual alloy particles are bonded to each other. The porous metal articles preferably have Bubble Point ratios of 1.6 or less.

While corrosion resistant alloy compositions of the invention correspond to iron aluminide compositions having $Fe_3Al$ to FeAl phases, the preferred alloy compositions include iron, aluminum, chromium, and boron. Other elements such as molybdenum, magnesium, niobium, zirconium, titanium, vanadium and yttrium and rare earth elements can be added to enhance different alloy performance characteristics. Some alloys which are suitable for use in the present invention are of a type described in McKamey et al. U.S. Pat. No. 4,961,903, incorporated herein by reference.

The preferred method of manufacture contemplates formulating a stabilized, preferably thixotropic, suspension of iron aluminide powder. The preferred cylindrical, seamless metal filter may be formed by pouring the resulting slurry into a ceramic core which is spun to compact the powder against the interior wall of the core. After further processing, the formed tube is dried, optionally densified, and vacuum sintered. The sintered tubes are then fabricated into filters in conformity with the teachings of Koehler, U.S. Pat. No. 4,822,692, incorporated herein by reference.

Other objects and advantages of the present invention will become apparent from the detailed description given hereinafter. It should be understood, however, that the detailed description and specific embodiments are given by way of illustration only, since various changes and modifications within the spirit and scope of the invention will become apparent from the detailed description.

MODES FOR CARRYING OUT THE INVENTION

The metal filters, both flat sheet filters and particularly the preferred seamless metal filters in accordance with the subject invention, are prepared using a stabilized suspension of the metal particulate. The stabilized suspension is comprised of a liquid medium, the metal particulate, a stabilizing agent, and a binding agent. While separate constituents can be used as the stabilizing agent and the binding agent, preferably a single constituent serves to both stabilize a dispersion of the metal particulate and, upon drying of the suspension, bind the particles to each other to provide the requisite "green" or unsintered strength; that is, the material which serves as the stabilizer of the dispersion is also preferably a binding agent which provides the green strength upon drying of the suspension. The alloy determined to be most suitable for this invention is now described. The procedure for its preparation is then elaborated upon.

The alloy suggested for use in this process system should possess increased room temperature ductility, resistance to corrosion in oxidizing and sulfur-bearing environments and elevated temperature strength comparable to known materials. Thus, the alloys of this system are deemed to be applicable, for example, in catalytic cracking processes and stack scrubbing systems.

A composite alloy similar to the type described by McKamey et al in U.S. Pat. No. 4,961,903 is well suited for use in hostile environments. Those alloys have a composition of $Fe_3Al$ but with chromium and selected additions of boron, molybdenum, niobium, zirconium, vanadium, carbon, and yttrium. The composite alloys of the present invention include iron aluminides which range in concentration from $Fe_3Al$ to FeAl phases. The compositions of the invention preferably also include other elements. For example, The composition range of this preferred improved alloy is, in atomic percent, 23–56 Al, 0.5–12.5 Cr, up to 5.0 Mo, up to 1 Nb, up to 0.5 Zr, up to 0.3 B and/or C, up to 0.5 V, up to 0.1 Y, up to 0.1 of a rare earth, such as Ce, the balance being Fe. More preferably, the concentration range of the components of the alloy, in atomic percent, is 24–55 Al, 1–7.5 Cr, 0–3 Mo, up to 1 Nb, up to 0.5 Zr, 0.02–0.3 B and/or C, up to 0.5 V, up to 0.1 Y, up to 0.1 of a rare earth, such as Ce, the balance being Fe. The optimum concentration range for this alloy is, in atomic percent, 26–52 Al, 1.5–6 Cr, 0–2 Mo, up to 1 Nb, up to 0.5 Zr, 0.02–0.3 B and/or C, up to 0.5 V, up to 0.1 Y, up to 0.04 of a rare earth, such as Ce, the balance being Fe. The total amount of the additives to the iron/aluminum base composition range from about 2 to about 14 atomic percent.

Alloys within these composition ranges have demonstrated room temperature ductility up to about 10% elongation with yield and ultimate strengths at 600° C. at least comparable to those of modified chromium-molybdenum steel and Type 316 stainless steel. The oxidation resistance of the alloys used in this invention is far superior to that of the Type 316 stainless steel.

Tests of alloys with individual additives indicated that improvements in strength at both room temperature and at 600° C. are obtained from addition of molybdenum, zirconium or niobium. However, these same additives tend to decrease the room temperature ductility. Molybdenum produces significant increases in creep rupture life (up to 200 hours), which is equivalent to some austenitic stainless steels. Only the addition of chromium produces a substantial increase in room temperature ductility.

The alloys compare favorably against Type 316 Stainless Steel for oxidation resistance in air at 800° C. and 1000° C. The chromium-containing iron aluminide alloys of the present invention demonstrate improved corrosion resistance at elevated temperatures. That is, the iron aluminide compositions of the present invention, containing from about 0.5 to about 12.5 atomic percent of chromium, preferably about 1.0 to about 7.5 atomic percent chromium and most preferably about 1.5 to about 6.0 percent chromium, demonstrate a high resistance to corrosion at elevated temperatures when employed in many situations encountered in industrial applications. Thus, in the presence of moisture, the chromium-containing iron aluminide alloys of the present invention demonstrate notable resistance to corrosion at elevated temperatures, typically temperatures above about 800° F. Some alloys exhibit a tendency for the oxide coating to spall. Spalling was substantially minimized and even prevented when niobium or yttrium was incorporated into the alloy. The loss in weight of 316 stainless steel, about 1.0 mg/cm², after almost 100 hours of oxidation at 800° C. is due to spalling of oxide scales from specimen surfaces. In contrast, the alloys suggested for use in the metal filters exhibit weight loss of about a quarter of that amount.

A suggested iron-aluminide composition range for a superior alloy which gives the best compromise between ductility strength and corrosion resistance consists primarily of iron with 23–56 atomic percent aluminum, up to 12.5 atomic percent chromium, and about 0.3 to about 5 atomic percent of additive selected from molybdenum, niobium, zirconium, boron, carbon, vanadium, yttrium, rare earth, such as cerium, and mixtures of the foregoing. More specifically, an improved iron aluminide is provided by a composition that consists primarily of Fe and, expressed as atomic percent, 23–56 Al, up to 12.5 Cr, up to 5 Mo, up to 1 Nb, up to 0.5 Zr, 0.02–0.3 B and/or C, up to 0.5 V, up to 0.1 Y, up to about 0.1 of a rare earth, such as Ce, and the remainder being iron.

Preferably, the concentration range of the components of the alloy, in atomic percent is 24–55 Al, 1–7.5 Cr, 0–3 Mo, up to 1 Nb, up to 0.5 Zr, 0.02–0.3 B and/or C, up to 0.5 V, up to 0.1 Y, up to 0.1 of a rare earth, such as Ce, the balance being Fe. A group of preferred alloys within this composition range consists primarily of about 26–50 at. % Al, 2 to 5 at. % Cr, up to 2 at. % Mo, up to 1 at. % Nb, up to 0.2 at. % Zr, up to 0.3 at. % B and/or C, up to 0.05 at. % yttrium, up to 0.2 at. % V and up to 0.1 at. % Ce, the remainder being iron. Specific exemplary alloys are expressed below first in weight percent and then in atomic percent. Preferred alloys for use in this invention are, in weight percent:

Fe, 15.7 Al, 4.3 Cr, 1.9 Nb, 0.01 B
Fe, 15.8 Al, 2.2 Cr, 2 Mo, 0.01 B
Fe, 15.6 Al, 4 Mo, 0.2 Zr, 0.5 C
Fe, 14.5 Al, 4.3 Cr, 1.9 Nb, 0.2 Zr, 0.04 B
Fe, 15.9 Al, 4.4 Cr, 0.06 Y
Fe, 15.1 Al, 4.3 Cr, 1.5 Nb, 0.01 B, 0.2 Mo
Fe, 17.1 Al, 2.2 Cr, 0.6 Nb, 0.2 Mo, 0.2 Zr, 0.01 B, 0.06 Y
Fe, 15.9 Al, 5.5 Cr, 0.2 Zr, 0.05 B
Fe, 15.8 Al, 2.2 Cr, 1.0 Nb, 0.01 B
Fe, 15.8 Al, 5.4 Cr, 1.0 Nb, 0.01 B, 0.2 V
Fe, 24.2 Al, 2.3 Cr, 2.2 Mo, 0.01 B
Fe, 32.3 Al, 2.5 Cr, 2.3 Mo, 0.01 B and in corresponding atomic percent, respectively:

Fe, 28 Al, 4 Cr, 1 Nb, 0.05 B,
Fe, 28 Al, 2 Cr, 1 Mo, 0.05 B
Fe, 28 Al, 2 Mo, 0.1 Zr, 0.2 C
Fe, 26 Al, 4 Cr, 1 Nb, 0.1 Zr, 0.2 B
Fe, 28 Al, 4 Cr, 0.03 Y
Fe, 27 Al, 4 Cr, 0.8 Nb, 0.05 B, 0.1 Mo
Fe, 30 Al, 2 Cr, 0.3 Nb, 0.1 Mo, 0.1 Zr, 0.05 B, 0.03 Y
Fe, 28 Al, 5 Cr, 0.1 Zr, 0.2 B
Fe, 28 Al, 2 Cr, 0.5 Nb, 0.05 B
Fe, 28 Al, 5 Cr, 0.5 Nb, 0.05 B, 0.2 V
Fe, 40 Al, 2 Cr, 1 Mo, 0.05 B
Fe, 50 Al, 2 Cr, 1 Mo, 0.05 B

Moving now to fabrication of the preferred filter structures of the present invention, the seamless filter structures employing the above identified alloys, sintered metal porous filter structures may be produced according to U.S. Pat. No. 4,822,692, Koehler, subject to certain modifications. In the process of this invention, the sintering step is generally conducted in the range of about 1149 to about 1316° C. (about 2100 to about 2400° F.). Typically, this is achieved in a two stage process. First, the green structure is subject to a preliminary "soak" in a vacuum at about 1173° C. (2145° F.) for about an hour. This soak is immediately followed by up-ramping the temperature to about 1229° C. (2245° F.) for about twenty minutes. The resulting sintered filter is then cooled. Also, it may be desirable to up-ramp to a slightly higher temperature, e.g., about 1243° C. (2270° F.), to obtain slightly greater strength but at a sacrifice of some porosity. Flat sheet filters may also be prepared, subject to certain modifications described below, by the method described by Koehler et al in U.S. Pat. No. 5,149,360, specifically incorporated herein by reference.

The form of the metal particulate is generally not critical. The particle shapes may be irregular dendritic, acicular or spherical, but irregular is preferred. The particle size will generally range between about 1 to about 150 $\mu$m with narrow particle size ranges preferred. Particle sizes of U.S. Standard Screen sizes of −100, +325, which corresponds to about 40 to 147 $\mu$m, are preferred. The particle size selected contributes to the filter porosity obtained. For example, the nominal particle size percentages are—under 44 $\mu$m: less than 1.5%, from 44 $\mu$m to 53 $\mu$m: 3.0%, from 53 $\mu$m to 74 $\mu$m: 26.1%, from 74 $\mu$m to 104 $\mu$m: 35.5%, from 104 $\mu$m to 147 $\mu$m: 33.4%, and over 147 $\mu$m: 0.5%. Coarser filters can be developed from particles in the higher ranges (up to 300 $\mu$m).

Basically, in preparing the filters of the subject invention, an organic or inorganic stabilizing/binding agent is combined with a liquid medium, preferably water, in amounts to provide the requisite concentration of the stabilizing binding agent in the liquid medium. The weight ratio of metal particulate to liquid medium typically is from about 0.5:1 to, preferably, 1:1.

For the stabilizing/binding agent, preferred is polyacrylic acid (available from B. F. Goodrich Chemical Company under the trade name CARBOPOL). As discussed below, the stabilizing/binding agent preferably comprises, by weight, from about 0.1 percent to about 2.0 percent of the mixture, i.e., the stabilizing/binding agent and the liquid medium. The preferred stabilizing/binding agent is CARBOPOL 934, which provides the medium with a relatively high viscosity. For example, in a CARBOPOL 934/water mixture, where the CARBOPOL 934 comprises 0.35 percent by weight (based on the weight of the water), the viscosity is approximately 750 centipoise at 20° C. When the CARBOPOL 934 comprises 0.9 percent of the mixture (based on the weight of the water), the viscosity of the mixture is approximately 1,200 centipoise. Mixtures of CARBOPOL 934 and water are preferred because the combination provides compositions having substantially consistent viscosities, i.e., mixtures of these constituents provide compositions with viscosities which are readily reproducible.

Based on the diameter of the largest particles of the metal particulate to be suspended in the stabilized suspension, a value for the viscosity of the stabilizing/binding agent-liquid medium mixture that will render the suspension sufficiently stable can be determined. The desired viscosity of the stabilized suspension in accordance with this invention is such that the suspension is capable of holding the metal particulate in suspension and thereby remaining substantially uniformly dispersed prior to lay down under the impetus of the centrifugal force generated in a cylindrical ceramic rotating container. Knowing the desired viscosity of the stabilizing/binding agent-liquid medium mixture, the relative amounts of the constituents to be used in preparing the mixture can be determined. It is, therefore, desirable to use a stabilizing/binding agent which will, when mixed with the liquid medium to be used, produce a suspension having relatively consistent bulk viscosity values with regard to the relative amounts of constituents used and relatively constant viscosity values throughout the suspension.

The combination of stabilizing/binding agent and liquid medium (sometimes referred to herein as the carrier) is preferably mixed until uniform dispersion of the stabilizing/binding agent is obtained. The metal particulate material is then added and mixed with the stabilizing/binding agent-liquid medium mixture to provide a uniform stabilized dispersion or suspension of the metal particulate in the carrier. The weight ratio of the metal particulate to the carrier, i.e., the other components in the stabilized suspension, is typically about 5:1 to about 0.5:1, and preferably about 1:1. This ratio depends primarily on the desired thickness of the porous article and the interior volume of the mold or container.

The amount of particulate metal powder required for a given metal article can be determined by the following relation:

Amount of particulate metal powder (weight) needed=$V_a \cdot p \cdot K$ where $V_a$=annular volume of the finished seamless porous metal article, i.e., the volume occupied by the wall of the structure;

p=the apparent density of the metal particulate powder; and

K=the shrinkage factor.

The shrinkage factor, K, is determined empirically by measuring the wall thickness of the formed structure before and after sintering.

The viscosity of the stabilized suspension of dispersed metal particulate is preferably below the gel consistency so that, for ease of processing, the stabilized suspension can be poured. However, a gelled stabilized suspension and a high rate of rotation may be preferable when relatively large particles are used.

For some systems, the suspension of metal particulate in the liquid medium containing the stabilizing/binding agent is stable after a thorough mixing has been completed. By "stable" or "stabilized" is meant that the metal particulate material is in suspension and will not settle out at a rate fast enough to adversely affect the formation of the desired structure; that is, no settling or elutriation of particulate occurs prior to the initiation of rotation.

For many applications it is preferred to add an additional component to set up the stabilizing/binding agent. For example, the addition of a neutralizing base, ammonium hydroxide, to CARBOPOL 934 or a neutralizing acid such as nitric acid, to colloidal alumina (discussed below) serves to neutralize the stabilized suspension and increase the viscosity to a substantial degree. Such systems are very thixotropic, i.e., they have a very high apparent viscosity when undisturbed (low shear condition) and, hence, settling of the suspended particulate is retarded. When vigorously agitated, they have a low effective viscosity and, hence, are very effective in dispersing the metal particulate. Since these suspensions are very stable, they may be prepared in advance of the time they are used without settling out of the metal particulate. Alternatively, stabilizing/binding agents may also be used which do not require the addition of another component to set up the suspension. CARBOPOL 934, the preferred stabilizing/binding agent, may be used with or without the addition of a neutralizing base. For example, with corrosive-sensitive metal particulate, neutralized CARBOPOL 934 is preferred because it is less acidic. In other cases, it may be preferable to use a viscosity-increasing agent to aid in stabilizing the suspension.

A variety of viscosity-increasing agents which serve to stabilize the metal particulate suspension and also act as a binding agent when the liquid medium is removed by drying may be used. CARBOPOL (Polyacrylic acid) is particularly desirable. As previously noted, CARBOPOL 934 is particularly preferred. CARBOPOL 934 has a molecular weight of about 1,250,000. It has a molecular weight of about 3,000,000. Other organic materials which can be used include carboxy methyl cellulose, carboxy ethyl cellulose, polyethylene oxide, sodium carboxy methyl cellulose, guar gum, alginates, methyl cellulose, and locust bean gum. In general, when water is used as the liquid medium, water compatible stabilizing/binding agents which volatilize and/or decompose substantially completely prior to or during sintering may be used.

Some inorganic materials are also quite effective. Examples of such substances include sodium silicate, potassium silicate, sodium aluminate and colloidal alumina, with colloidal alumina being most preferred.

In carrying out the embodiment which constitutes the preferred method of this invention, a container or mold of desired shape, preferably an elongated, hollow cylindrical container, is at least partially filled, preferably completely filled, with the stabilized suspension of dispersed metal particulate. The container or mold may be formed of any material capable of withstanding the sintering temperatures employed in the process. Examples of materials that can be used include silicon carbide, silicon nitride, molybdenum, and various ceramics. However, the coefficient of thermal expansion of the metal particulate must be substantially greater than that of the container or mold. This is necessary to maintain good support for the compacted particulate structure during the sintering step. A container or mold with a lower coefficient of thermal expansion than the metal particulate does not expand as much as the dried metal particulate structure as the sintering step is carried out. As a result, the metal particulate tends to press into the walls of the mold, thereby maintaining the shape and compacted nature of the structure until sintering is complete. Preferably, the coefficient of thermal expansion of the metal particulate is at least one and one-half times as great as that of the container or mold. For example, for the preferred ceramic containers or molds, as discussed below, the thermal coefficient of expansion generally is within the range of from about $1.0 \times 10^{-6}$ to about $4.0 \times 10^{-6}$ inches per inch per degree Fahrenheit. For the preferred metal particulate, the coefficient of thermal expansion substantially corresponds to that of Stainless Steel SS 316, about 1% for every 500° C.

As noted, ceramic tubes are the preferred structures for use as the mold or container. Tight tolerance, cylindrical ceramic tubes are available which will produce very uniform seamless porous metal cylindrical articles. In addition, ceramic tubes are not adversely affected by the sintering process and the formed metal article does not adhere to the ceramic material as a result of the sintering step. Accordingly, the container can be reused. Several examples of compositions of ceramic tubes are as follows:

(a) 99.8% $Al_2O_3$ (alumina) extruded to full density;
(b) 96.0% $Al_2O_3$ (alumina) extruded to full density;
(c) 85.0% mullite and 15.0 percent glass extruded to full density;
(d) 100% mullite extruded to full density;
(e) 80% $Al_2O_3$ and 20% $SiO_2$ slip-cast and isostatically pressed to 80% density.

The composition of the ceramic identified by the letter (e) above is the most preferred for use with the present invention. Ceramic tubes of this material exhibit good dimensional tolerances over a relatively long length. For example, ceramic tubes of this composition are available with standard camber (curvature) tolerances for tubes with diameters from 2.54 to 15.2 cm (1 to 6 in.) of no greater than about 0.05 cm (0.020 in.) variation per linear foot and no greater variations in wall thickness than about 0.012 cm (0.005 in.), i.e., the concentricity of the inside diameter to the outside diameter is not greater than 0.012 cm (0.005 in.) As the wall thickness of the ceramic tube increases, the diameter tolerance becomes even tighter. The porous articles formed using ceramic tubes with these tight tolerances have comparable tight tolerances.

Prior to adding the stabilized suspension of dispersed metal particulate to the container, one end of the container is preferably sealed with, for example, a rubber stopper or other suitable means. The amount of stabilized suspension of dispersed metal particulate to be added is preferably the amount necessary to substantially completely fill the container. A filled container is preferred because it provides more uniform distribution of the metal particulate, resulting in a product with a more uniform pore structure.

Additionally, a completely filled container aids in start up because the center of gravity is more nearly coincident with the longitudinal axis of the cylinder. After adding the stabilized suspension to the container, it is then sealed and mounted on a structure capable of rotating the container about its longitudinal axis, preferably with the container in a substantially horizontal position. For example, a machine lathe, such as a Clausing lathe, or a spindle may be used. The container or mold is rotated at a high enough rate to provide a centrifugal acceleration at the interior wall of the formed structure equal to or greater than about 100, more preferably 110, and most preferably about 115 gravities (Gs) to obtain adequate compaction. It has been empirically determined that this provides the minimum force necessary to obtain adequate compaction to provide the articles in accordance with this invention having the requisite uniform pore characteristics. By "adequate compaction" is meant the maximum amount of compaction which can be achieved without the application of external mechanical force, e.g., application of additional force by static mechanical means, such as a bladder inserted in the mold or container and inflated to press the formed structure against the interior wall of the mold. The rate of rotation required varies inversely with the diameter of the article being formed. For example, for a two inch diameter porous article, the rate of rotation is about 2,000 rpm. For a one inch diameter article, the rate of rotation is about 3,000 rpm. For a one-half inch diameter article, the rate of rotation is about 4,000 rpm.

It may be desirable to construct a porous metal structure having a graded pore structure, e.g., a transition of pore sizes, with the structure having larger particles and, therefore, larger pores near the exterior wall and smaller particles and, therefore, smaller pores near the interior wall of the structure. One of the ways the method in accordance with the present invention can be used to provide such a structure is to introduce metal particulate of a broad particle size distribution into the stabilized suspension and then rotate the container initially at a lower rate of revolution, thereby laying down a higher percentage of larger particles than of smaller particles over the interior wall of the mold, followed by an increase in the rate of rotation as the structure is formed so that the smaller size or finer particles are distributed over the previously distributed larger particles so that the final or interior portion of the structure laid down comprises more smaller particles than it does larger particles and a graded pore structure with an outside-in configuration is formed. The final rate of rotation must be sufficiently high to provide at least about 100 Gs of centrifugal acceleration to obtain the desired level of compaction which provides the articles in accordance with this invention with the desired uniform pore characteristics. When operating in this manner, a lower concentration of metal particulate in the suspension is preferred.

Another method for producing a graded structure, contemplated by the present invention, comprises laying down a first stabilized suspension on the interior of the container at a specified rate of rotation, removing the supernatant liquid, drying the material thus laid down, and introducing another stabilized suspension containing metal particulate having a different particle size distribution than the first stabilized suspension, i.e., finer (or coarser) particles, and repeating the procedure. A structure having any desired number of layers, with layers of varying pore size, can be produced in this manner. Further, the gradation of pore sizes from larger to smaller can be on either an inside-out or outside-in basis. Indeed, it is also within the scope of this invention to provide layers of different pore sizes in alternating fashion, e.g., a fine pored layer on the exterior of the structure, an intermediate layer of larger pore size, and an inner layer of fine pored material. As discussed above, the final rate of rotation with each stabilized suspension must be sufficiently high to provide at least about 100 Gs of centrifugal acceleration for each particular layer prior to its being dried.

The container is generally rotated at the desired rpm for from about 3 to 5 minutes, following which it is stopped. Longer times may be used but have not been found to be necessary. Preferably, the container is allowed to slow down without being stopped abruptly and, more preferably, it is allowed to spin until its momentum runs out. The container is then removed from the rotating structure, supernatant fluid is removed, and the formed structure is dried in the container, preferably while in a horizontal position, to provide the structure with green or unsintered strength. Drying is preferably conducted in a convection oven at from about 37° C. (100° F.) to about 99° C. (210° F.) for about 30 minutes to about 5 hours or longer.

The container is then placed in a furnace, such as a vacuum furnace or reducing atmosphere furnace, most preferably a vacuum furnace, to remove volatile material and to fuse the individual particles of the metal particulate to each other. The sintering is best done with the structure in a vertical position to avoid distortion due to high creep rates of the metal particulate at elevated temperatures.

The sintering step itself is preferably carried out at a temperature high enough to promote solid state diffusion of metal atoms from one particle to another to form the sintered bonds. This typically corresponds to a temperature in the range of about 1149 to about 1316° C. (about 2100 to about 2400° F.). Preferably, a temperature in the range of from about 1173° C. (2145° F.) to about 1243° C. (2270° F.) is used. More preferable is a temperature from about 1226° C. (2240° F.) to about 1232° C. (2250° F.). A period of time of heating of from about 0.2 to about 2 hours has been found adequate and a period of about three-quarters of an hour is preferred. Preferably, the sintering step is carried out under a vacuum or in a pure hydrogen or other reducing atmosphere.

The sintering step must be carefully controlled to balance the degree of solid state diffusion with the preservation of adequate porosity. In other words, if sintered at too high a temperature or for too long a period of time, while the resulting strength of the filter may be enhanced, the porosity may be decreased significantly. Accordingly, the selection of the sintering conditions of the instant invention is important to maintenance of the desired selected porosity of the resulting metal seamless filter.

In certain instances it may be preferable to provide the dried structure with solid hardware members, typically at each end of the structure, and sinter them in situ, fusing the individual particles of the metal particulate to each other and fusing the solid hardware members to adjacent particles of the metal particulate to provide the structure with solid, closed pore or even porous end fitments, e.g., end caps. For example, a completed filter element can be provided by inserting (positioning) end caps and/or other connecting fittings in the ends of the container or mold prior to initiating rotation. Alternatively, the fitment can be inserted after the structure has been dried but prior to sintering. For example, it has been found that the dried structure has sufficient green strength (prior to sintering) that a threaded fitting can be screwed into it. During the subsequent sintering step, the metal particulate will form bonds between the individual particles and the solid metal members, thereby forming a completed filter element without the need for subsequent fabrication operations. Internal support members, such as a spiral reinforcing spring, can also be positioned in the container or mold for incorporation into the formed structure.

Upon completion of the sintering step, the resulting structure is cooled and is then removed from the furnace. Upon cooling, the seamless porous metal structure will be easily removed from the container or mold due to the formation of sinter bonds between the individual metal particles of the metal particulate.

An advantage of using a ceramic tube is that there is no need to employ a releasing agent, e.g., a carbon mold releasing agent, to prevent the seamless structure from binding to the mold. The use of such releasing agents may contaminate the sintered structure and are difficult to remove. Accordingly, it is highly preferred to prepare the articles in accordance with this invention without the use of a release agent or any other coating material.

The cylindrical structure formed by the above process may be rolled, coined, swaged, welded, brazed, and/or resintered if desired. When a solid member must be attached by welding to the structure, it has been observed that welding the porous structure is improved due to the uniform and non-stressed nature of the porous structure.

The porous metal articles in accordance with this invention typically have nominal diameters ranging from about one-half to about 6 inches, preferably from about 2 to about 3 inches (about 5.1 to about 7.6 cm), and wall thicknesses ranging from about 0.005 to about 1 inch (about 0.013 to about 2.5 cm), more preferably from about 0.005 to about 0.64 inch (about 0.013 to about 1.6 cm). As prepared, the lengths of the cylindrical structures will typically range from about 1 inch (2.5 cm), or even less, to about 48 inches (122 cm), or ever higher. The prepared structures may be cut into any desired lengths. Typically, the length to diameter (L/D) ratio of the structures as prepared will be less than about 100:1, more typically in the range of from about 1:1 to about 100:1.

The porous metal articles in accordance with this invention typically have F2 ratings at beta=100 (as hereinafter defined) of from about 1 to about 100, preferably from about 5 to about 40, micrometers. The sintered structures in accordance with this invention have relatively high void volumes at a given efficiency relative to other sintered structures of this general type due to the uniformity of the formed structures in accordance with this invention and the relative absence of density variations typically present in sintered metal structures heretofore known to the art.

The F2 test used in making pore size measurements is a modified version of the F2 test developed in the 1970's at Oklahoma State University (OSU). In the OSU test, a suspension of an artificial contaminant in an appropriate test fluid is passed through the test filter while continuously sampling the fluid upstream and downstream of the filter under test. The samples are analyzed by automatic particle counters for their contents of five or more preselected particle diameters and the ratio of the upstream to downstream count is automatically recorded. This ratio, as used herein, is known in the industry as the beta ratio ($\beta$).

The beta ratio for each of the five or more diameters tested may be plotted as the ordinate against particle diameter as the abscissa, usually on a graph in which the ordinate is a logarithmic scale and the abscissa is a $\log^2$ scale. A smooth curve is then drawn between the points. The beta ratio for any diameter within the range tested can then be read from this curve. Efficiency at a particular particle diameter is calculated from the beta ratio by the formula:

Efficiency, percent=100 (1−1/beta).

As an example, if beta=100, efficiency=99 percent.

Unless otherwise stated, the removal rating cited in the examples presented herein is the particle diameters at which beta=100. Hence, the efficiency at the removal rating cited is 99 percent.

In the modified F2 test, efficiencies of the inventive metal filter in the range of from 18 to 22 micrometers were determined using as a test contaminant a suspension of AC fine test dust, a natural silicious dust supplied by the AC Spark Plug Company. Prior to use, a suspension of the dust in water was mixed until the dispersion was stable. Test flow rate was ten liters per minute per square foot of filter area.

The Bubble Point tests referred to in the examples below were carried out at ambient temperature on appropriately end-capped porous, cylindrical metal articles to be tested. An article was submerged in a liquid bath of Filmex B (190 proof denatured ethyl alcohol available from Ashland Chemical Company) to wet out all the pores. Prior to being placed in the bath, one end of the cylindrical structure was sealed. The other end was sealed in a manners to prevent liquid from entering the interior of the structure but to also permit communication of pressurized, dry air from an appropriate source. Pressure was then applied to the interior of the structure. The pressure required for the first or initial bubble of air to appear on the exterior surface of the cylinder was recorded.

The applied pressure was then increased until a flow rate of 20,000 cubic centimeters of air per minute per square foot of external surface area was flowing through the structure. This pressure was then recorded. For all of the examples set out below, the distribution of bubbles on the exterior surface of the cylinders tested at this point was observed to be quite uniform.

After recording the pressure at this flow rate, the flow rate was increased to 60,000 cubic centimeters of air per minute per square foot of external surface area and the pressure again recorded. Once again, the pressure was increased to provide a flow rate of 90,000 cubic centimeters of air per minute per square foot of external surface area and the pressure required to maintain this flow rate recorded.

The ratio of the pressure required to maintain the specified flow rates, i.e., 20,000, 60,000, and 90,000, to the pressure required to form the initial bubble is a measure of the uniformity of pore size in the formed structure; that is, the closer the ratio is to 1.0, the more uniform the pore size and the tighter the pore size distribution. This invention achieves ratios of about 1.5 and, more precisely, as set forth in the examples, 1.56 at a flow rate of 90,000 $cm^3/min/ft^2$.

The following procedure is used to eliminate the effect of the pressure drop of the structure itself on the ratio. The clean pressure drop, that is the drop obtained in air with no wetting of the pores, at each of the specified air flow rates of 20,000, 40,000, and 60,000 is measured. The obtained pressure drop is subtracted from the pressure drop measured at the corresponding flow rate when the structure was submerged in Filmex B prior to calculation of the ratios. Thus, the contribution to pressure drop of the structure, itself, is eliminated.

GENERAL PROCEDURE FOLLOWED IN THE EXAMPLES

The porous articles in the following examples were prepared using the method generally described above and detailed below. Where alternative procedures were followed in any of the following examples, such divergence from the general procedure set out below is described with regard to the particular example.

Manufacturing Procedure

Example 1A

Hollow Seamless Filter

First, a CARBOPOL 934 solution consisting of 5.6 grams of CARBOPOL 934 per liter of water was prepared. The solution was thickened with 28% $NH_4OH$ to yield a viscosity of approximately 5000 cps.

An appropriate quantity (900 grams) of −100, +325 iron aluminide ($Fe_3Al$) powder, available from Ametek Corp., containing 2% Cr and known as FAS, was added to 700 ml of thickened CARBOPOL 934 and shaken for 1.5 minutes to form a uniform suspension.

The shaken powder slurry was poured into a ceramic core having dimensions of 5.956 cm (2.345 inches) inner diameter×61 cm (24 inches) long and sealed at one end. After introducing the slurry to the ceramic core, the other end of the ceramic core was also sealed. The ceramic core was positioned horizontally and fixed between the centers of the spinning machine. The ceramic core was spun for a period of about 3 minutes and at a rate to provide a centrifugal acceleration at the interior wall of about 100 Gs so the suspended powder would be properly deposited and compacted.

After this first spinning, the ceramic core was removed from the spinner and the seals were removed from both ends of the cylinder. A majority of the supernatent was allowed to drain from the ceramic core. The remaining supernatent liquid was removed after the ceramic core was remounted on the spinning machine and subjected to further spinning for about 4 minutes at 3000–3250 rpm, allowing the residual supernatent liquid to drain as a result of the centrifugal forces applied. The ceramic core was then removed from the spinning machine and dried in an air convection oven for 12 hours at 65° C. (150° F.).

After drying, a 3.17 cm (1.25 inch) diameter hollow iron core was inserted in the center of the ceramic core containing the compacted tube of iron aluminide powder. A −100 mesh ceramic powder, specifically tabular alumina powder was next poured in the annulus between the iron aluminide powder and the hollow core. The entire assembly was then placed on a vibrating table to densify the tabular alumina by vibrating the core until no further signs of settling occurred.

Following the densification step, the ceramic core was then placed in a furnace and the tubes were vacuum sintered at 1229° C. (2245° F.) for 20 minutes yielding a sintered seamless tube with a 6.03 cm (2.375 inches) outer diameter× 60.6 cm (23.875 inches) length.

In testing, tubes produced from the above described method from −100, +325 iron aluminide spherical powder, provided the following results:

TABLE 1

Uniformity Evaluation of Tube I[a]

| FLOW (CC/MIN/FT²) | (A) CLEAN AIR ΔP (in. H₂O) | (B) BUBBLE PT. (in. H₂O) | (B − A) PRESSURE AT FLOW (in. H₂O) | RATIO OF PRESSURE (B − A) TO PRESSURE OF FIRST BUBBLE POINT |
|---|---|---|---|---|
| 5,000 | .01 | 10.50 | 10.49 | 1.04 |
| 10,000 | .02 | 10.90 | 10.88 | 1.08 |
| 20,000 | .03 | 12.20 | 12.17 | 1.20 |
| 40,000 | .05 | 13.20 | 13.15 | 1.30 |
| 60,000 | .08 | 15.00 | 14.92 | 1.48 |
| 90,000 | 1.03 | 17.20 | 15.80 | 1.56 |

[a]Tube I — First Bubble Point in inches of water: 10.1
Wall thickness: 0.064 inch
ΔP @ 28 ft/minute in inches of water: 4.70

TABLE 2

Uniformity Evaluation of Tube II[b]

| FLOW (CC/MIN/FT²) | (A) CLEAN AIR ΔP (in. H₂O) | (B) BUBBLE PT. (in. H₂O) | (B − A) PRESSURE AT FLOW (in. H₂O) | RATIO OF PRESSURE (B − A) TO PRESSURE OF FIRST BUBBLE POINT |
|---|---|---|---|---|
| 5,000 | .01 | 10.40 | 10.39 | 1.01 |
| 10,000 | .02 | 11.50 | 11.48 | 1.11 |
| 20,000 | .03 | 13.40 | 13.37 | 1.30 |
| 40,000 | .05 | 14.40 | 14.34 | 1.39 |
| 60,000 | .08 | 15.10 | 15.01 | 1.46 |
| 90,000 | 1.03 | 17.50 | 16.20 | 1.57 |

[b]Tube II — First Bubble Point in inches of water: 10.3
Wall thickness: 0.064 inch
ΔP @ 28 ft/minute in inches of water: 4.90

Example 1B

Hollow Seamless Filter

As in Example 1A, a CARBOPOL 934 solution consisting of 5.6 grams of CARBOPOL 934 per liter of water was prepared. The solution was thickened with 28% $NH_4OH$ to yield a viscosity of approximately 5000 cps.

An appropriate quantity (900 grams) of −100, +325 iron aluminide ($Fe_3Al$) powder, available from Ametek Corp., containing 2% Cr and known as FAS, was added to 700 ml of thickened CARBOPOL 934 and shaken for 1.5 minutes to form a uniform suspension.

The shaken powder slurry was poured into a ceramic core having dimensions of 5.956 cm (2.345 inches) inner diameter×61 cm (24 inches) long and sealed at one end. After introducing the slurry to the ceramic core, the other end of the ceramic core was also sealed. The ceramic core was positioned horizontally and fixed between the centers of the spinning machine. The ceramic core was spun for a period of about 3 minutes and at a rate to provide a centrifugal acceleration at the interior wall of about 100 Gs so the suspended powder would be properly deposited and compacted.

After this first spinning, the ceramic core was removed from the spinner and the seals were removed from both ends of the cylinder. A majority of the supernatent was allowed to drain from the ceramic core. The remaining supernatent liquid was removed after the ceramic core was remounted on the spinning machine and subjected to further spinning for about 4 minutes at 3000–3250 rpm, allowing the residual supernatent liquid to drain as a result of the centrifugal forces applied. The ceramic core was then removed from the spinning machine and dried in an air convection oven for 12 hours at 65° C. (150° F.).

After drying, the composite structure of a ceramic mold and dry metal particulate was prepared for isotactic compression by inserting a rubber tube through the inner diameter and another rubber tube on the outer diameter. The lengths of both rubber tubes were sufficient to overhang each end of the composite ceramic/metal particulate structure by 1.5" to 3.0" (3.8 to 7.6 cm). The ends of both rubber tubes were sealed together on each end by a band clamp on the outer diameter rubber tube against the inner diameter rubber tube. The inner diameter rubber tube on each end was supported by a section of metal pipe so that enough clamping force could be provided by the band clamp to effectively seal both the inner and outer rubber tubes together and provide an air tight seal.

The prepared tube was then placed in a pressure vessel filled with water and sealed. The vessel was pressurized to 35,000 psig (2380 atmospheres) for a period of 3 minutes providing compaction of the metal powder against the interior wall of the ceramic mold. The vessel was then vented to atmospheric pressure and opened. The prepared tube was then removed from the vessel and the inner and outer rubber tubes removed from the composite ceramic/metal particulate structure.

Following the isostatic compaction step, the composite ceramic/metal particulate structure was then placed in a furnace and the tubes were vacuum sintered at 2270° F. (1243° C.) for 20 minutes. The resulting sintered tube exhibited tensile strengths of 10,000 psi.

Following the densification step, the ceramic core was then placed in a furnace and the tubes were vacuum sintered at 1229° C. (2245° F.) for 20 minutes yielding a sintered seamless tube with a 6.03 (2.375 inches) outer diameter× 60.6 cm (23.875 inches) length.

In testing, tubes produced from the above described method from −100, +325 iron aluminide spherical powder, provided the following results:

TABLE 3

Uniformity Evaluation of Tube III[c]

| FLOW (CC/MIN/ SQ.FT.) | (A) CLEAN AIR ΔP (IN. H$_2$O) | (B) BUBBLE POINT (IN. H$_2$O) | (B − A) PRESSURE AT FLOW (IN. H$_2$O) | RATIO OF PRESSURE (B − A) TO PRESSURE OF FIRST BUBBLE POINT |
|---|---|---|---|---|
| 5000 | .08 | 20.0 | 19.92 | 1.00 |
| 10000 | .21 | 21.1 | 20.89 | 1.04 |
| 20000 | .38 | 23.3 | 22.92 | 1.15 |
| 40000 | .80 | 24.2 | 23.40 | 1.17 |
| 60000 | 1.20 | 25.6 | 24.40 | 1.22 |
| 90000 | 1.72 | 27.3 | 25.58 | 1.28 |

[c]Tube III — First Bubble Point in inches of water: 20.0
Wall Thickness: .070 inch
ΔP @ 28 ft/minute in inches of water: 14.6

TABLE 4

Uniformity Evaluation of Tube IV[d]

| FLOW (CC/MIN/ SQ.FT.) | (A) CLEAN AIR ΔP (IN. H$_2$O) | (B) BUBBLE POINT (IN. H$_2$O) | (B − A) PRESSURE AT FLOW (IN. H$_2$O) | RATIO OF PRESSURE (B − A) TO PRESSURE OF FIRST BUBBLE POINT |
|---|---|---|---|---|
| 5000 | .06 | 20.9 | 20.84 | 1.04 |
| 10000 | .21 | 21.9 | 21.69 | 1.08 |
| 20000 | .37 | 22.3 | 21.93 | 1.09 |
| 40000 | .78 | 24.2 | 23.42 | 1.17 |
| 60000 | 1.18 | 25.0 | 23.82 | 1.19 |
| 90000 | 1.68 | 27.0 | 25.32 | 1.26 |

[d]Tube IV — First Bubble Point in inches of water: 20.1
Wall thickness: .071 inch
ΔP @ 28 ft/minute in inches of water: 14.8

Example 2

Flat Sheet Filter

A flat sheet filter according to the present invention was prepared by the method set forth in the example appearing in U.S. Pat. No. 5,149,360 with the following exception. The sintering procedure involved placing the samples in a vacuum sintering oven and reducing the pressure to $5 \times 10^{-5}$ torr. After a period of about 1 hour, the system was backfilled with N$_2$ to a pressure of 25.4 centimeters (10 inches) of Hg. The procedure of pumping down the system to $5 \times 10^{-5}$ torr and backfilling with N$_2$ was repeated again to reduce the partial pressure of oxygen in the system. The system was again pumped down to a pressure of $5 \times 10^{-5}$ torr and the temperature was raised at a rate of 200° F./hour to 2,000° F. The system was then upramped at a rate of 50° F./hour to 2,260° F. The system was held at the latter temperature for 5 hours at the pressure of $5 \times 10^{-5}$ torr. This vacuum was maintained as the system was allowed to cool to 800° F. The system was then backfilled with N$_2$ at 800° F. and thereafter a cooling fan was turned on to cool the system to ambient temperature. Samples were produced having the properties reported in Table 5.

TABLE 5

| Flow (cc/min/ ft$^2$) | Dry air ΔP (in. H$_2$O) | Bubble Point (in. H$_2$O) | Pressure @ Flow (in. H$_2$O) | Ratio of pressure (B − A) to pressure at first bubble point | First Bubble Point (in. H$_2$O) |
|---|---|---|---|---|---|
| 5000 | .005 | 8.5 | 8.495 | 1.13 | 7.5 |
| 10000 | .030 | 9.3 | 9.27 | 1.23 | 7.5 |
| 20000 | .040 | 9.7 | 9.66 | 1.28 | 7.5 |
| 40000 | .100 | 10.0 | 9.90 | 1.32 | 7.5 |
| 60000 | .140 | 10.6 | 10.46 | 1.39 | 7.5 |
| 90000 | .230 | 10.8 | 10.57 | 1.40 | 7.5 |

Example 3

Exposure of Alloy Compositions to Reducing and Oxidizing Atmospheres

Iron aluminide alloy compositions were prepared containing about 28 to about 30 atomic percent aluminum and the remainder iron, corresponding to an Fe$_3$Al phase. Other alloy compositions were used containing the same iron aluminide composition with the exception that some of the iron was substituted with 2% chromium. The specific compositions employed are listed in Table 7.

Samples of each alloy composition were subjected to exposure to a reducing atmosphere and to an oxidizing atmosphere using the conditions and gaseous atmospheres listed in Table 6. The weight of each alloy sample was measured both before and after exposure to the reducing or oxidizing atmosphere. Measurements of the pressure drop across each sample of filter media formed from the alloy compositions were made before and after exposure to the reducing or oxidizing atmosphere. The results are reported in FIGS. 1 to 4.

Different alloy samples were exposed at a constant elevated temperature to the reducing atmosphere and to an oxidizing atmosphere, respectively, for a period of 28 days. The conditions employed in the oxidizing atmosphere were designed to simulate one year of refinery service in a fluidized catalytic cracking system. This involved maintaining a temperature of 1350° F. while increasing the temperature to 1450° F. for eight hour periods four times at the end of 28 day cycle and to 1500° F. for one half hour at the end of the cycle. The total duration of heating when exposed to the oxidizing atmosphere, over several cycles was 157 days.

Figure 1:
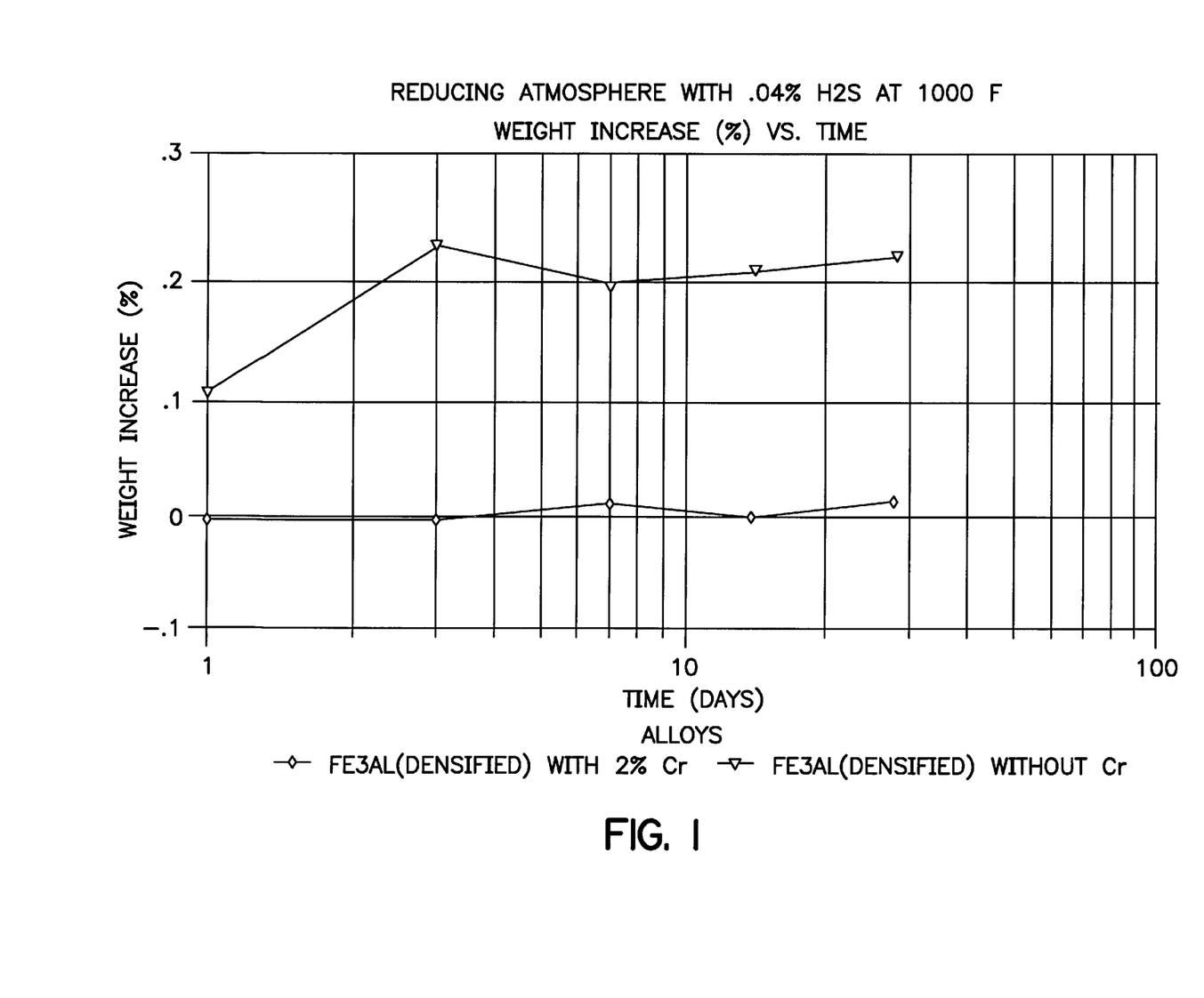
FIG. 1 is a graph comparing the increase in weight over time of porous media formed from two iron aluminide alloys, both with and without chromium, upon exposure to a reducing atmosphere of $H_2S$ at an elevated temperature.

FIG. 1 indicates that while the alloy composition lacking chromium increased in weight during exposure to a reducing atmosphere by about 0.2%, by weight, the alloy composition containing chromium showed no weight increase resulting from exposure to the reducing atmosphere. This result suggests some reactivity of the alloy composition with the reducing atmosphere.

Figure 2:
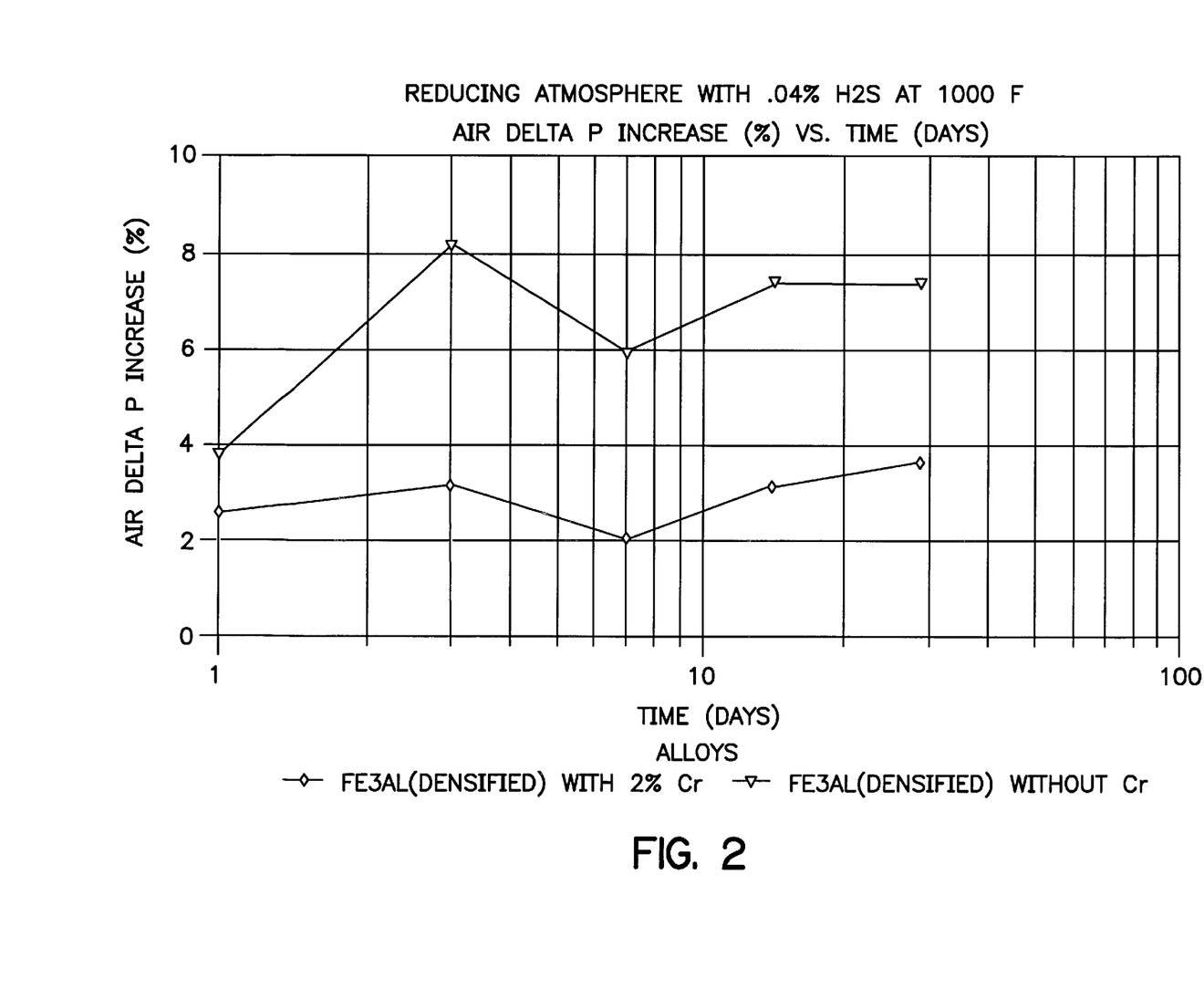
FIG. 2 graphically compares, over time, the increase in pressure drop across two iron aluminide porous media, both with and without chromium, upon exposure at an elevated temperature to a reducing atmosphere of $H_2S$.

The graph represented by FIG. 2 indicates that the pressure drop across a medium formed from an iron aluminide alloy composition containing no chromium increases by an average of about 40% as compared with a chromium-containing alloy composition subjected to the same reducing atmosphere. Thus, the service life of the chromium-free medium is decreased as a result of more restricted fluid flow and higher pressure drops.

Figure 3:
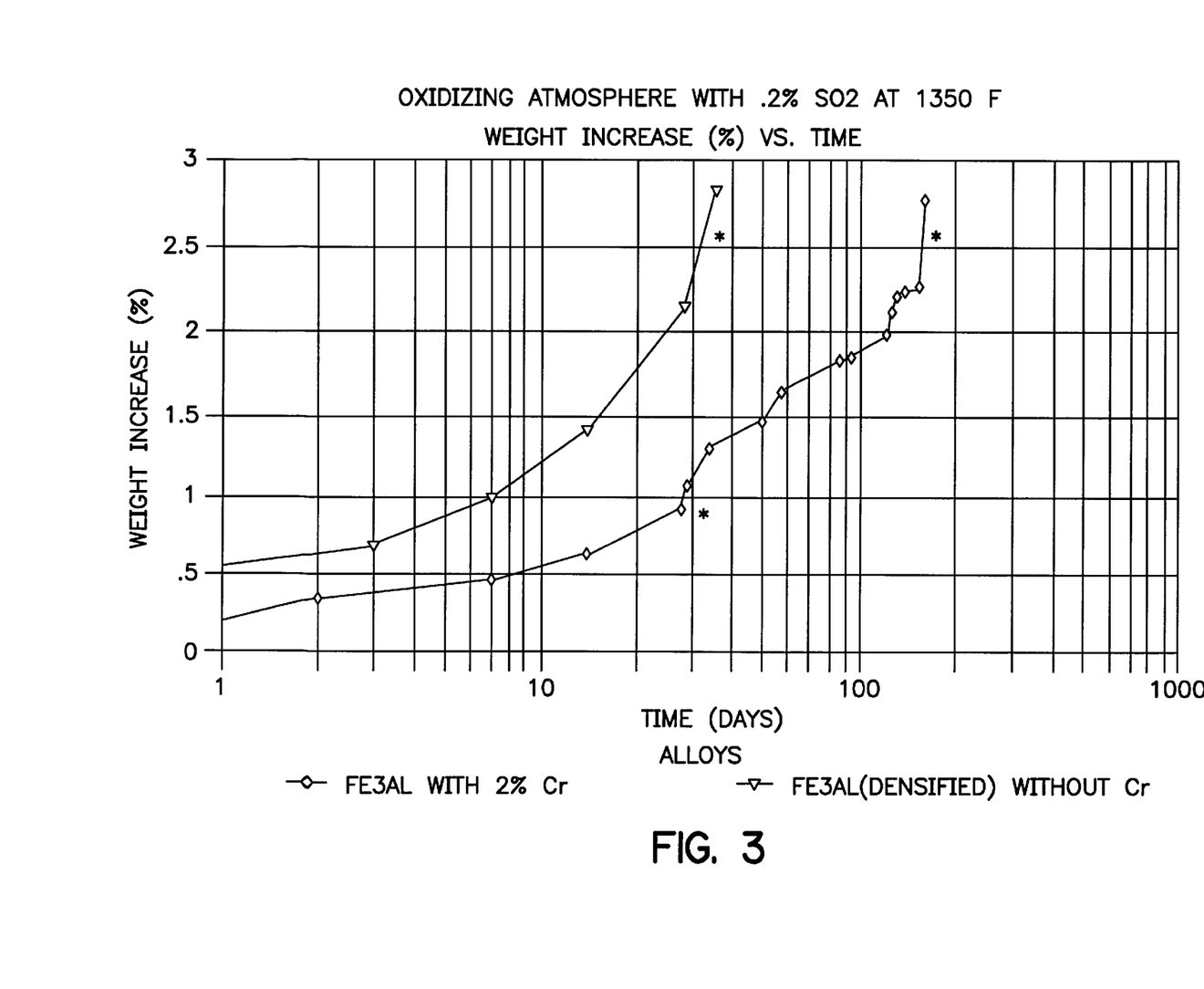
FIG. 3 graphically compares the increase in weight, over time, of two iron aluminide filter media, both with and without added chromium, upon exposure to an oxidizing atmosphere containing $SO_2$ under conditions simulating those of a fluidized catalytic cracking system.

FIG. 3 indicates that both the chromium-containing and the non chromium-containing alloys increase in weight over a period of time when subjected to an oxidizing atmosphere simulating the conditions of a fluidized catalytic cracking system. However, as the graph clearly indicates, the weight increase, and therefore the corrosive effect, is significantly greater with the iron aluminide lacking chromium.

Figure 4:
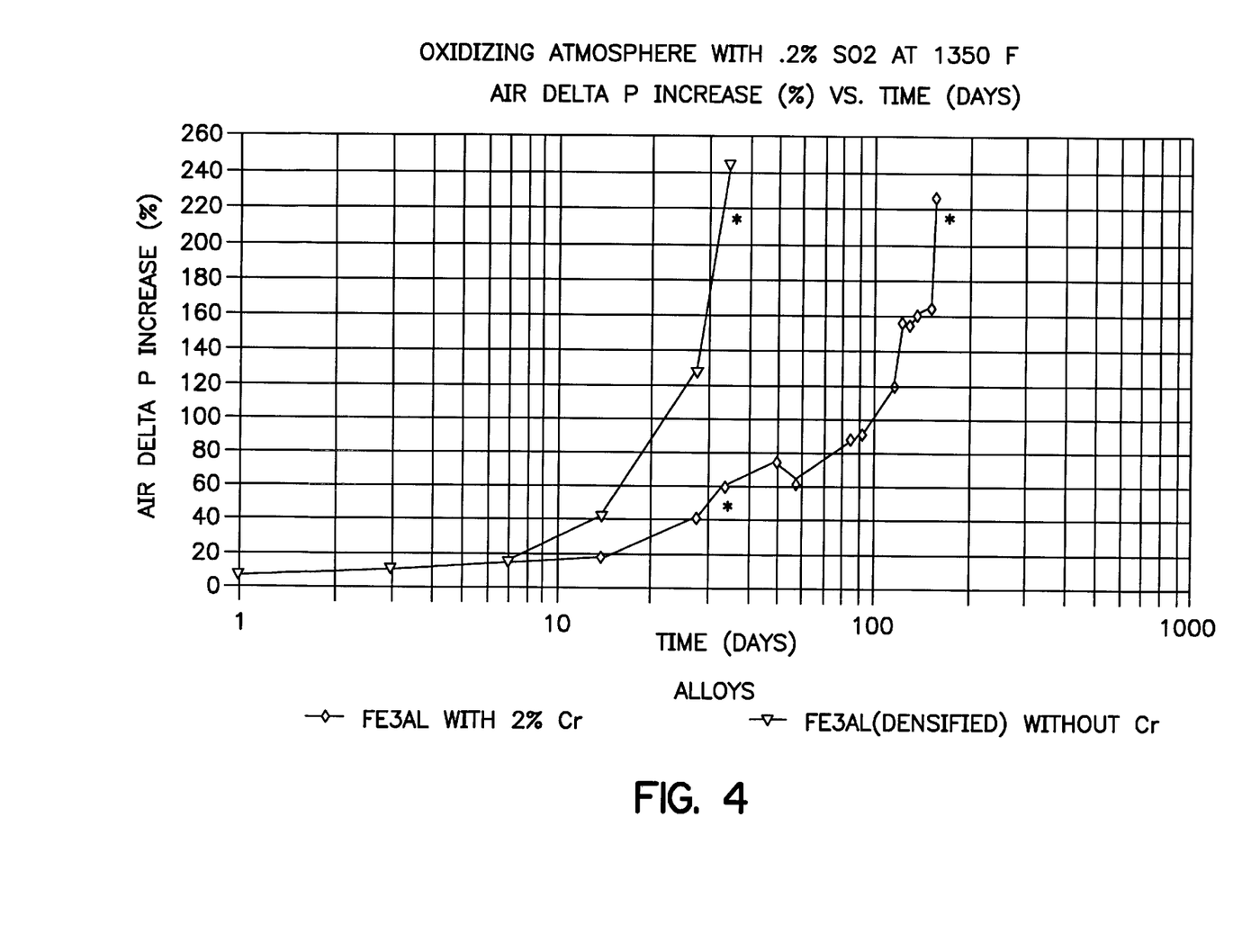
FIG. 4 graphically illustrates the increase in pressure drop, over time, across two iron aluminide metal media, both with and without added chromium, upon exposure at an elevated temperature to an oxidizing atmosphere containing $SO_2$ under conditions simulating those of a fluidized bed catalytic cracking system.

FIG. 4, like FIG. 3, indicates a significant increase in the pressure drop across a filter medium prepared from iron aluminide lacking chromium, as compared to the alloy composition which contains 2% chromium.

As these results indicate, iron aluminide compositions containing chromium according to the present invention demonstrate a greater chemical inertness or resistance to corrosion, particularly at elevated temperatures, as compared to chromium-free iron aluminide compositions.

TABLE 6

|  | REDUCING ATMOSPHERE ($H_2S$) | OXIDIZING ATMOSPHERE ($SO_2$)[+] |
|---|---|---|
| OPERATING TEMP. (° F.) | 1000 | 1350* |
| OPERATING PRES. (BAR G) | 1.0 | 1.0 |
| CATALYST | NONE | NONE |
| GAS COMPOSITION (VOL. %): |  |  |
| $N_2$ | 19.96 | 77.9 |
| $O_2$ | — | 1.9 |
| $CO_2$ | — | 15.2 |
| CO | — | — |
| $H_2O$ | 30 | 4.8 |
| $SO_2$ | — | 0.2 |
| $SO_3$ | — | — |
| $NO_2$ | — | — |
| NO | — | — |
| $H_2$ | 50 | — |
| $H_2S$ | 0.04 | — |

[+]simulation of fluidized catalytic cracking (accelerated)
*includes simulation of one year of refinery service (conducted at 1350° C. with (8 hours) at 1450°, repeated four times plus, and 0.5 hour at 1500° F., performed once)

Industrial Applicability

This invention defines a porous, preferably seamless, sintered iron aluminide powder metal filter, preferably cylindrical in configuration, and a manufacturing procedure therefor. The filters, according to this invention, possess long on-stream service life even in high temperature oxidation environments such as high sulfur content petroleum cracking operations, reducing sulfidation environments, and fluid catalyst cracking applications. Such environments also include high temperature processes for sulfur containing sour crude and coals, catalytic cracking, contaminated hydrocarbon filtration, and stack scrubbing systems. Furthermore, the filters of this invention are capable of withstanding repeated reverse flow (blow back) or jet pulsing to clean the filter and purge solids formed on the filter.

TABLE 7

CHEMICAL COMPOSITION FOR $FE_3AL$

| SIMULATION | | CHEMICAL ANALYSIS (WT. %) | | | | | | | | | |
|---|---|---|---|---|---|---|---|---|---|---|---|
| Cr | TEST | Cr | Ni | Fe | Mo | Mn | Al | O | N | C | S | OTH. |
| WITHOUT | OXIDIZING .2% $SO_2$ 1350° F. & REDUCING .04% $H_2S$ 1000° F. | .04 | .03 | BALANCE | | .15 | 17.12 | .50 | .0046 | .0442 | | Si = .03% Cu = .12% B = .010% Nb = .06% |
| WITH 2% | REDUCING | 2.22 | | BALANCE | | | 16.25 | .33 | .003 | .14 | .002 | B = .015% |

TABLE 7-continued

CHEMICAL COMPOSITION FOR FE₃AL

| | SIMULATION | CHEMICAL ANALYSIS (WT. %) | | | | | | | | | |
|---|---|---|---|---|---|---|---|---|---|---|---|
| Cr | TEST | Cr | Ni | Fe | Mo | Mn | Al | O | N | C | S | OTH. |
| | .04% H₂S 1000° F. OXIDIZING .2% SO₂ 1350° F. | 2.2 | | BALANCE | | .063 | 15.9 | .179 | .0035 | .0282 | .0024 | Nb = .02% |

What is claimed is:

1. A porous metal filter possessing enhanced anticorrosive properties comprising a porous body of densified and sintered metal particles including an alloy composition of iron aluminide having a range in concentration corresponding to Fe₃Al to FeAl phases and having a Bubble Point ratio of about 1.6 or less.

2. A porous metal filter according to claim 1 additionally including at least two additives selected from the group consisting of chromium, boron, molybdenum, niobium, zirconium, vanadium, and yttrium.

3. A porous metal filter according to claim 2 wherein the alloy comprises iron and, in atomic percent, 23–56 Al, up to 12.5 Cr, up to 5.0 Mo, up to 1 Nb, up to 0.5 Zr, up to 0.5 V, up to 0.1 Y, up to 0.3 B, and up to 0.1 of a rare earth metal.

4. A porous metal filter according to claim 3 wherein the total amount of Cr, Mo, Nb, V, and Y in atomic percent, is between about 2 and about 14 percent.

5. A porous metal filter according to claim 1 having a substantially uniform pore structure.

6. A porous metal filter according to claim 1 including a cross-sectional gradient of pore sizes.

7. A porous metal filter according to claim 1 wherein the porous body has a tubular configuration defining an annular wall with a substantially uniform diameter and thickness.

8. A porous metal filter according to claim 7 wherein the wall is continuous and seamless.

9. A method for forming a metal filter with augmented anticorrosive properties for gas filtration processes comprising the steps of:
 a) introducing into a filter mold a stabilized suspension of iron aluminide metal alloy particles dispersed in a carrier comprising a liquid medium including a stabilizing agent, the iron aluminide having a range in concentration corresponding to Fe₃Al to FeAl phases;
 b) removing the liquid medium in a controlled manner to deposit the metal particles in a layer of substantially uniform thickness;
 c) drying the deposited layer;
 d) densifying the deposited layer;
 e) sintering the deposited layer to fuse the metal particles in a manner to form a porous structure conforming to the mold; and
 f) removing the molded porous filter from the filter mold.

10. The method according to claim 9, wherein the alloy further includes at least two additives selected from the group consisting of chromium, boron, molybdenum, niobium, zirconium, vanadium, carbon, and yttrium.

11. The method according to claim 9 wherein the stabilizing agent is selected from the group consisting of polyacrylic acid, carboxy methyl cellulose, carboxy ethyl cellulose, polyethylene oxide, sodium carboxy methyl cellulose, guar gum, alginates, methyl cellulose, and locust bean gum.

12. The method according to claim 9 wherein the stabilizing agent is polyacrylic acid.

13. The method according to claim 9, further including the step of adding a neutralizing base to the stabilizing agent to substantially increase the viscosity of the stabilized suspension.

14. The method according to claim 9 wherein the stabilizing agent is sodium silicate, potassium silicate, sodium aluminate or colloidal alumina.

15. The method according to claim 9 wherein the size of the metal particles in the range of about 44 μm to about 149 μm.

16. The method according to claim 9 wherein the weight ratio of the metal particles to carrier is about 1:1 and the particle size distribution, by weight, percentages are—under 44 μm: less than 1.5%, from 44 μm to 53 μm: 3.0%, from 53 μm to 74 μm: 26.1%, from 74 μm to 104 μm: 35.5%, from 104 μm to 147 μm: 33.4%, and over 147 μm: 0.5%.

17. The method according to claim 9, wherein the step of introducing the stabilized suspension into a filter mold includes introducing the stabilized suspension into a filter mold formed from a material selected from the group consisting of ceramics, silicon nitride, molybdenum, and silicon carbide.

18. A method for forming a metal filter with augmented anticorrosive properties for gas filtration processes comprising the steps of:
 a) introducing into a filter mold a stabilized suspension of iron aluminide metal alloy particles dispersed in a carrier comprising a liquid medium including a stabilizing agent, the iron aluminide having a range in concentration corresponding to Fe₃Al to FeAl phases;
 b) removing the liquid medium in a controlled manner to deposit the metal particles in a layer of substantially uniform thickness;
 c) drying the deposited layer;
 d) isostatically compressing the deposited layer; and
 e) sintering the deposited layer to fuse the metal particles in a manner to form a porous structure conforming to the mold.

19. A method according to claim 18 wherein the step of introducing into a mold a stabilized suspension includes introducing into the mold a stabilized suspension of iron aluminide metal alloy particles which includes zirconium as an additive.

20. A method according to claim 18 wherein the step of isostatically compressing the deposited layer includes compressing the deposited layer in an amount sufficient to result in a tensile strength of 10,000 psi.

\* \* \* \* \*